March 24, 1953 R. F. PIERCE 2,632,206
METHOD AND APPARATUS FOR PRODUCING FILM
Filed Jan. 26, 1950 4 Sheets-Sheet 1

Inventor
Russell F. Pierce
By Harry H. Levin
Attorney

March 24, 1953  R. F. PIERCE  2,632,206
METHOD AND APPARATUS FOR PRODUCING FILM
Filed Jan. 26, 1950  7 Sheets-Sheet 4

Inventor
Russell F. Pierce
By Harry H. Leven
Attorney

Patented Mar. 24, 1953

2,632,206

UNITED STATES PATENT OFFICE 2,632,206

METHOD AND APPARATUS FOR PRODUCING FILM

Russell F. Pierce, Terre Haute, Ind., assignor to The Visking Corporation, Chicago, Ill., a corporation of Virginia Application January 26, 1950, Serial No. 140,687

9 Claims. (Cl. 18—14)

This invention relates to the production of plastic film. More particularly, it relates to a new and improved inflated tube extrusion method of producing self-sustaining plastic film and apparatus therefor.

U. S. Patent No. 2,461,975 discloses a tube extrusion process wherein a thermoplastic, in a molten condition, is extruded through an annular die in the form of a seamless tubing, and as the tubing is being withdrawn from the die and while it is in the plastic formative state, inflating the tubing to a predetermined diameter. A cooling gaseous medium is blown onto the exterior peripheral surface of the tubing in the vicinity of the point of extrusion to chill the tubing to an extent that when the tubing has been inflated to the predetermined diameter it will be in a set condition.

As shown in U. S. Patent No. 2,461,975 and U. S. Patent No. 2,461,976, the cooling gaseous medium may be blown onto the tubing through a perforated spiral coil or ring.

Though the previously described method and apparatus constitute a substantial advance in the art and have achieved wide commercial success, it has been found that the cooling gaseous medium in such methods was applied to the external circumferential wall of the inflated tubing in an uneven flow. As a consequence, the tubing was unevenly cooled, causing thick and thin areas extending in directions depending on the air flow. When such tubing was subjected to stretching by the inflating medium, the thin areas stretched more than the thick areas. Upon winding of the flattened tubing, there resulted an uneven, humped roll. In the case of plastics having a cold flow, the winding tension stretched the film over the humps so that when the film was unwound it would not lie flat, had ripples and required special precautions in the printing, converting, etc., thereof.

An object of this invention is to provide a new and improved tube extrusion method for producing self-sustaining plastic film and apparatus therefor.

Another object of this invention is to provide a tube extrusion method and apparatus for producing self-sustaining plastic film which, when reeled, will produce a substantially uniform roll.

Another object of this invention is to provide a tube extrusion method and apparatus for producing self-sustaining plastic film which will lie flat after unwinding from a roll thereof.

Other and additional objects will become apparent hereinafter.

The term "formative plastic state" is used herein to define that state of the plastic wherein it is in the unset or partly set condition and can be permanently enlarged, as by stretching.

In carrying out the invention, a thermoplastic organic material is dry-extruded from a melt thereof through an annular die orifice to form a seamless tubing, and as the tubing is being withdrawn from the die and while it is in the plastic formative state, inflating the tubing to a predetermined diameter and setting the expanding tubing when it has reached the desired final diameter.

The withdrawal of the tubing from the die is obtained by a pair of squeeze rolls spaced from the point of extrusion. The squeeze rolls also serve to collapse the inflated tubing into the form of a ribbon, in which condition it is wound up on a wind-up reel. The squeeze rolls are driven preferably at a speed that stretches the tubing while in the plastic formative stage.

The inflation of the tubing is obtained by a gaseous medium introduced into the interior of the tubing. The inflating medium is entrapped or confined between the nip of the squeeze rolls and the die through which the molten thermoplastic is extruded. As a result, the inflating medium comprises an isolated gaseous bubble which advances bodily, while remaining substantially constant in quantity, through the successive portions of the tubing withdrawn from the die by the squeeze rolls. The quantity of the gaseous medium constituting the entrapped or confined inflating medium (isolated bubble) is selected so that the extruded tubing, while still in the formative plastic stage, will be expanded to the diameter necessary to produce the predetermined flat width when the tubing is flattened by the squeeze rolls.

In general, any gaseous medium which does not deleteriously affect the plastic may be used as the inflating medium. Atmospheric air, because it is so cheap, is preferred.

When the tubing in the formative plastic state has been expanded to the desired diameter, the thermoplastic is set, i. e., converted to that state which resists and is not further expanded by the isolated gaseous bubble. It is to be noted that the amount of internal air pressure, produced by the isolated gaseous medium and required to stretch the tubing in the formative plastic state, is less than the amount of pressure required to stretch a set tubing. When the tubing is expanded by internal air pressure while in the formative plastic state, the tubing will permanently acquire that diameter to which it has been inflated.

The tubing is converted from the formative plastic state to the set condition by directing and applying a controlled volume of an external air flow on and around the tubing while in the formative plastic state. The cooling by air of the tubing in the formative plastic state is regulated in accordance with volume and temperature of the air so that the inflation of the tubing while in the formative plastic state can be effected either near the lips of the die or near the draw rolls as desired. The control of the point of inflation of the tubing aids in controlling, within narrow tolerances, the flat width and wall thickness of the finished tubing. It also permits control of the structural characteristics of the tubing (orientation).

The invention is not restricted to any particular gaseous cooling medium. It can be air at room temperature, with or without added moisture, or chilled to a temperature lower than room temperature. In general, any gaseous medium either at room temperature or lower and which does not deleteriously affect the tubing, can be used.

In the preferred form of this invention, the external cooling medium is applied in the form of a flowing annular stream onto the exterior wall of the tubing by a ring through which the tubing passes and which rotates about its center axis.

The rotational speed of the cooling ring is rather critical and depends on the diameter of the die and wall thickness of extruding tubing. If it is too high, the tubing is twisted and causes consequent production difficulties. In general, satisfactory operation has been obtained when the ring is rotated at speeds between approximately 0.2 and approximately 2.5 R. P. M., depending on the diameter of the die and which can be determined by empirical test. Normally, the lower rotational speeds are used with large diameter tubing.

The ring which supplies the annular stream of cooling medium is located in the vicinity of the point of extrusion of the tubing from the die whereby the tubing passes therethrough as it is withdrawn from the die by the squeeze rolls. Means, hereafter more fully described, are provided to rotate the ring about the center axis of the tubing. Means, also hereinafter described, are also provided to supply the cooling medium to the ring.

It is to be noted that the tubing, from the point of extrusion to the point of flattening by the squeeze rolls, does not contact or engage any mechanical element.

The nature of the invention and the manner in which it may be practiced will become clear from the following detailed description when taken in conjunction with the accompanying drawings forming a part of this specification, and wherein, Figure 1 is a side elevation (with the extruder in partial section) of an apparatus for carrying out the invention;

Figure 1:
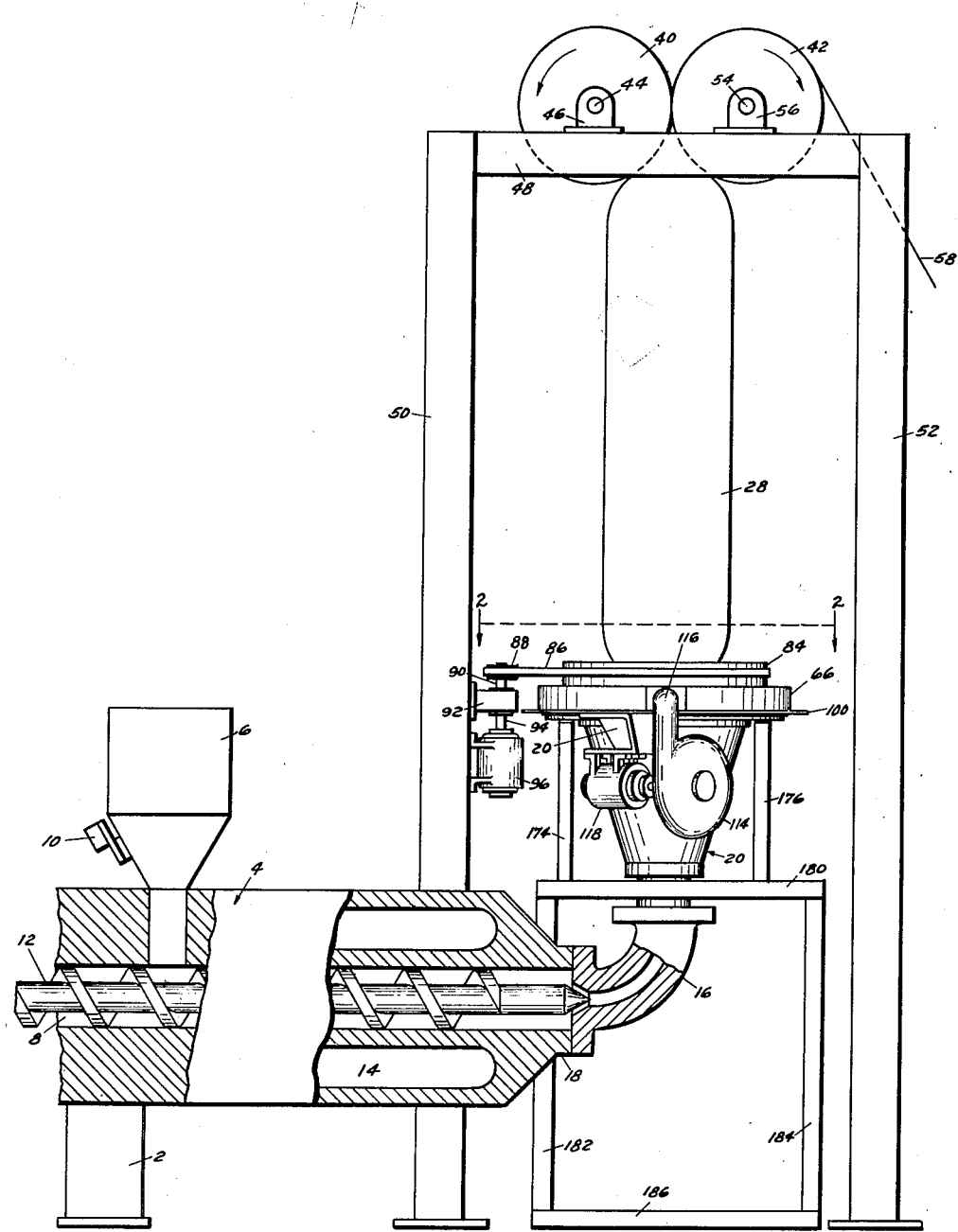
Figure 2:
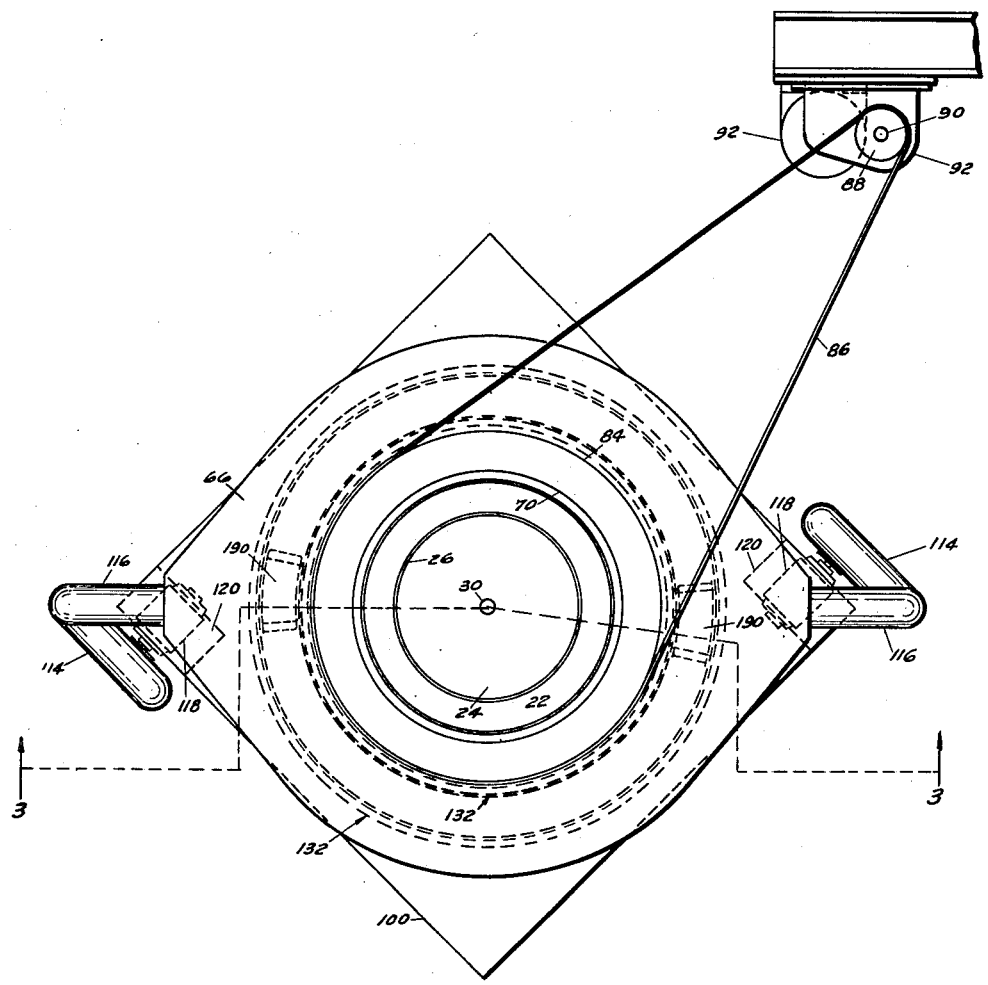
Figure 2 is a section taken on line 2—2 of Figure 1.

Referring now to the drawings wherein like reference numerals designate like parts, the reference numeral 2 designates a support carrying an extruder 4, provided at one end with a feed hopper 6 which feeds the selective thermoplastic into the screw chamber 8 thereof. An electric vibrator 10 of known construction cooperates with the hopper 6 to accelerate the feed of the thermoplastic material into the extruder. In the screw chamber 8 there is positioned a single threaded pitch screw 12 which, upon rotation in a clockwise direction, advances the thermoplastic through the extruder. The screw 12 is rotated in the known manner by means not shown. The extruder 4 is provided with a jacketed chamber 14 through which a heating medium is circulated.

As the thermoplastic material is fed by the screw 12 through the extruder previously mentioned it is molten, and in such condition is fed into a 90° elbow 16 appropriately secured, as by bolting, to the head 18 of the extruder. A die, generally indicated by the reference numeral 20, is secured in any appropriate manner to the outlet end of the elbow 16 and the molten thermoplastic passes thereinto.

Figure 3:
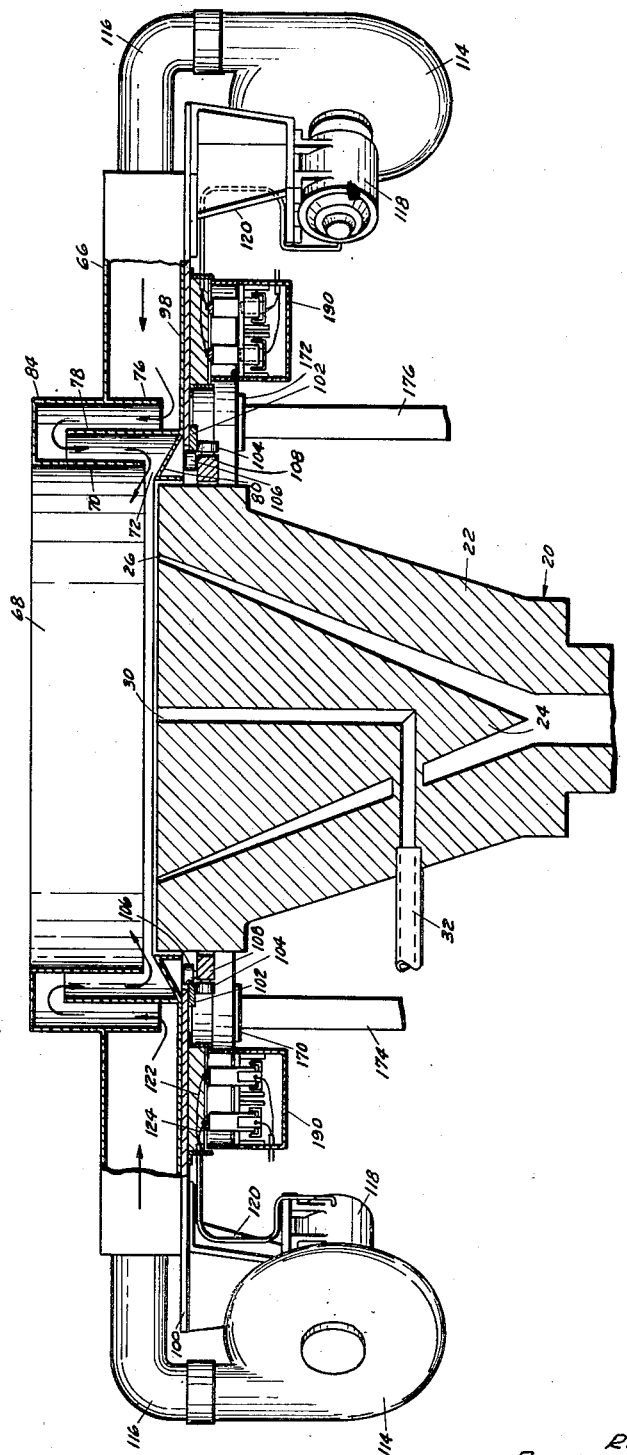
Figure 3 is a section taken on line 3—3 of Figure 2.
Figure 4:
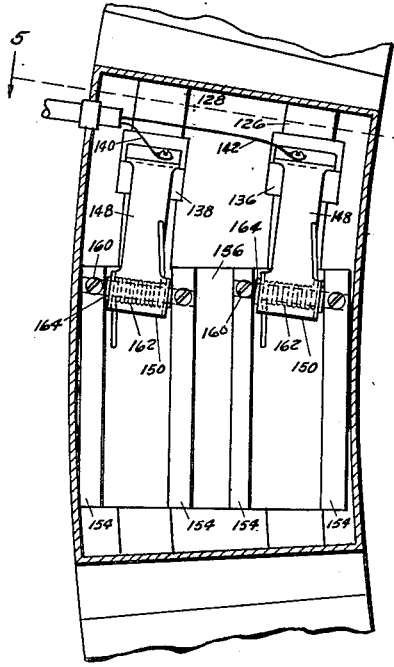
Figure 4 is a plan view of a brush holder and the brushes therein.
Figure 5:
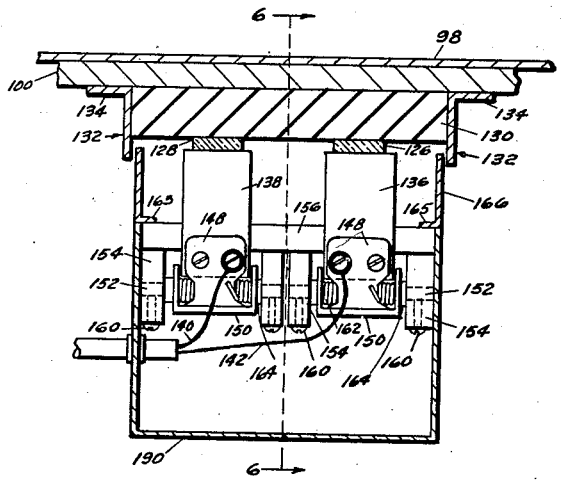
Figure 5 is a section taken on line 5—5 of Figure 4.
Figure 6:
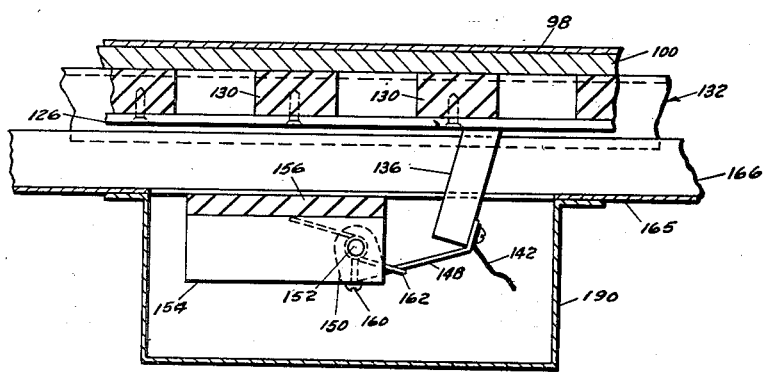
Figure 6 is a section taken on line 6—6 of Figure 5.

As shown in Figure 3, the die consists of a cup 22 and an adjustable pin 24 disposed in spaced relationship in the known manner to provide an annular orifice 26 from which the molten mass emerges as a hot, gumlike, viscous thermoplastic tubing 28. The die 20 is provided with a central orifice 30 which is connected to an air supply 32 whereby air is introduced interiorly of the tubing to inflate the same. The air supply 32 is provided with a valve, not shown, so that when the desired quantity of air has been introduced within the tubing, further supply thereof can be prevented. In the event the quantity of air within the tubing decreases as, for example, by leakage or otherwise, the requisite amount of air can be added by proper manipulation of the valve.

The inflated tubing 28 is withdrawn from the die orifice 26 in a substantially vertical direction by means of a pair of squeeze rolls 40 and 42 disposed in spaced relationship to the die. Squeeze roll 40 is rotatably mounted on shaft 44 in bearings 46 mounted on crosspieces 48 supported by uprights 50 and 52. Squeeze roll 42 is mounted on shaft 54 rotatably carried in bearings 56 mounted on crosspieces 48. Either or both rolls 40 and 42 are driven by conventional means, not shown. In either case, the peripheral speed of the rolls 40 and 42 is preferably such as will stretch the tubing while it is in the formative plastic state.

The rolls 40 and 42 also serve to collapse the tubing passing therebetween into a flattened, ribbonlike material, designated by the reference number 58 which is wound up on a wind-up reel driven by a torque motor, not shown. If desired, intermediate the squeeze roll 42 and the wind-up reel, not shown, guide rolls, also not shown, and serving to direct the flattened tubing from the squeeze roll to the wind-up reel, may be provided.

It is to be noted that the inflating medium is entrapped or confined between the nips of the rolls 40 and 42 and the die 20 and constitutes an isolated gaseous bubble which advances bodily while remaining substantially constant in quantity through the successive portions of the tubing extending between the die and nip.

As is shown in Figures 1 and 3, the tubing 28, as it is drawn from the die, passes through a ring which applies a cooling gaseous medium in the form of an annular stream onto the peripheral wall of the tubing. Referring now to Figure 3, the ring comprises an annular cylindrical housing 66 to which the gaseous cooling medium is supplied as hereinafter described. The ring is provided with a circular passage 68 and the inner wall 70 thereof is provided with a slot 72 extending circumferentially thereof and constituting an outlet whereby the gaseous cooling medium in the form of an annular stream is supplied to the passage. The diameter of passage 68 is such as to permit the tubing to pass therethrough without contacting the inner wall 70 or other part of the ring. The air ring is provided with a plurality of baffles 76 and 78 so that the gaseous medium will take the path shown in Figure 3 to the outlet 72. It is to be noted that the bottom 80 of the housing 66, between the inner wall 70 and the baffle 78 and which cooperates with the inner peripheral wall 70 to provide the outlet 72, is inclined upwardly in the direction toward the passage 68, whereby the annular stream of the cooling gaseous medium will be supplied in an upward, slightly converging direction relative to passage 68. If desired, the outlet of the ring may direct the cooling medium at right angles to the tubing.

As shown in Figure 1, the air ring is formed with a pulley surface 84 which cooperates with a continuous belt 86 driven by a pulley 88 on a shaft 90 of a speed reducer 92 appropriately connected to the motor shaft 94 of a motor 96. The speed reducer 92 and motor 96 are each appropriately mounted on upright 50.

For reasons which will become apparent hereinafter, the bottom 98 of the cooling ring is firmly secured to a plate 100. The ring-mounting plate 100 is provided with a central circular opening of a size sufficient to permit the forward end of the die to extend therethrough. A guide ring 102 is appropriately secured to the under side of the mounting plate 100 adjacent the opening as shown in Figure 3. The inner end of the guide ring 102 extends beyond the inner end of the mounting ring 100. The guide ring 102 cooperates with a plurality of rollers 104 and 106 (of the structure shown in U. S. Patent No. 2,099,660) mounted in spaced relationship on a band 108 removably clamped to the die 20. The rollers 104 cooperate with the bottom surface of the guide ring 102, while the cams 106 cooperate with the inner edge of the guide ring 102. By the construction just described, it will be apparent that upon driving the pulley 84 of the air ring, the latter, together with the mounting plate 100 on which it is secured, will rotate about the center axis of the die or tubing. Proper positioning and location of the cooling ring relative to the die can be effected by appropriately locating the supporting band 108.

Gaseous cooling medium such as, for example, air, is supplied to the cooling ring by a pair of oppositely disposed blowers 114. The outlet of each blower is connected by a pipe 116 to an opening in the air ring. Each blower 116 is driven by a separate motor 118 carried on a bracket 120 fastened to the mounting plate 100. Due to this construction, upon rotation of the cooling ring as previously described, the blower and its operating mechanism will be revolved about the center axis of the die.

The invention also contemplates separate means for supplying electrical energy to each of the motors 118 during the operation and such means will now be described. Since the means for each motor is the same, only one such means will be described and similar reference numerals will designate like parts in the separate means.

Motor 118 is electrically connected by leads 122 and 124 to inner and outer collector (bus) rings 126 and 128, respectively, which are securely fastened to spaced insulating blocks 130 arranged in a circle and which, in turn, are securely fastened to the mounting plate 100. A pair of guard rings 132, each having outwardly extending ears 134 secured to the mounting plate 100, are positioned adjacent the side edge of the blocks 130. Thus, upon rotation of mounting plate 100, the bus rings 126 and 128, together with the guard rings 132, will be rotated about their respective center axes.

Referring now to Figures 3, 4, 5 and 6, the reference numeral 136 designates an inner carbon brush and the reference 138 designates an outer carbon brush. Inner brush 136 is mounted, as hereinafter more fully described, for sliding contact with collector ring 126 and the outer brush 138 is similarly mounted in sliding contact with the outer collector ring 128. Each pair of brushes is electrically connected by leads 140 and 142 to a source of electrical energy.

Each of the brushes 136 and 138 is separately carried on one end of a brush holder 148. The other end of the brush holder 148 terminates substantially in a U-shaped member 150 which is rotatably mounted on a pivot pin 152, the opposite ends of which are secured in legs 154 of a block 156. Each leg 154 is provided with a set screw 160 for securing the pivot pin in position. A tension spring 162 cooperating with the brush holder 148 continuously urges and maintains the respective brush in contact with the bus ring with which it cooperates. In the preferred form, spacers 164 are provided between the legs 154 and the adjacent brush holder 148.

Each block 156 is secured to inwardly extending ears 165 of a pair of concentric rings 166 arranged in spaced relationship. The rings 166 are carried on a pair of oppositely disposed plates 170 and 172, mounted on uprights 174 and 176. The uprights 174 and 176 are disposed on a crosspiece 180, carried by the uprights 182 and 184. If desired, the uprights 182 and 184 may be tied together at the bottom by a crosspiece 186.

It is to be noted that the rings 166 are in spaced relationship to and overlapped by the guard rings 132.

A cover 190, enclosing the brush assembly, is appropriately secured to the rings 166. If desired, the cover 190 may also be secured to the block 156.

Alternatively, only one set of brushes by appropriate electrical connection can be used to deliver the electrical energy to the motors.

In operation, the selected thermoplastic material, preferably in granular or other subdivided form, is supplied to the hopper 6 from where it is fed into the extruder and from which it is extruded through the annular orifice 26 of the die in the form of a seamless tubing. The tubing is withdrawn from the point of extrusion by the squeeze rolls 40 and 42. An inflating medium is introduced into the tubing through the orifice 30 whereby the inflating medium is entrapped in the section of the tubing between the die and the nip of the squeeze rolls 40 and 42. The quantity of the inflating medium introduced into the tubing is such as will expand the tubing to the desired final diameter. The tubing, as it is withdrawn from the die, passes through passage 68 of the cooling ring, whereby it is subjected to the action of an annular stream of cooling gaseous medium which is supplied to the cooling ring by means of the blowers 114 and from which ring it passes into the passage 68 through the peripheral slot 72. The baffles in the cooling ring tend to reduce the eddy currents produced by the flow of the gaseous cooling medium through the ring. During operation, belt 86, cooperating with the pulley surface 84 of the cooling ring, causes the latter to rotate. Since the cooling ring is secured to the mounting plate 100, both will be rotated about the center axis of the die, the rollers 104 and 106 serving to facilitate and guide the mounting plate during operation. Inasmuch as the blowers 114 and the motors 118 are carried by the mounting plate, they, too, will be rotated about the center axis of the die. Likewise, the collector rings 126 and 128 will be rotated about the center axis of the die. The brushes 136 and 138 are stationary, but due to the details of mounting the same, each will always be in sliding contact with the respective cooperating bus ring whereby electrical energy for driving the motors for the blowers will be continuously supplied during operation.

As is apparent from the description hereinbefore, the cooling gaseous medium will issue from the outlet 72 in the cooling ring as an annular upwardly moving converging stream of gaseous cooling medium, and will impinge and strike the entire peripheral wall of successive sections of the inflated tubing passing through the zone of action of such stream. By appropriately positioning the supporting band 108 longitudinally with respect to the die, the outlet of the cooling ring may be adjusted up or down relative to the die orifice.

Though in the preferred form of the invention the gaseous cooling medium issues as a single annular stream from the rotating ring the invention is not restricted thereto. Instead of an annular slot, a plurality of annular slots or spaced openings may be used whereby a plurality of streams will issue from the ring and impinge on the peripheral wall of the tubing passing through the zone of action thereof.

It is to be noted that the tubing, from the moment it is extruded until it is collapsed and flattened by the squeeze rolls, does not contact or engage any mechanical element.

The principles of the invention are equally applicable to extrusion in upward, downward or horizontal direction.

Though the invention has been successively operated in the production of flattened tubing of polyethylene, the invention is not restricted thereto. In general, the invention can be utilized with any thermoplastic material, mixtures thereof, and mixtures of synthetic rubbers with thermoplastic materials. Each thermoplastic substance or composition possesses certain properties which may make it necessary to determine by experiment the variables in the process which have to be balanced in order to produce tubing of the desired characteristics. This may be especially so with regard to the quantity of gaseous cooling medium since the temperature at the lips of the die may be different with different thermoplastic substances or composition. Hereinafter is set forth a list of illustrative thermoplastic materials which can be used in this invention in addition to polyethylene:

Cellulose acetate
Cellulose acetate butyrate
Ethyl cellulose
Methyl methacrylate polymer
Nylon (extrusion or molding grade)
Polystyrene
Polyvinyl formal-acetate butyral
Copolymers of vinyl chloride and vinyl acetate (Vinylite)
Polyvinyl chloride (Geon)
Copolymers of vinyl chloride and vinylidene chloride (Saran)

The properties of the thermoplastic substance or composition can be modified, as by the incorporation therein of suitable modifying agents, such as, plasticizers, fillers, coloring agents, heat stabilizers, anti-oxidants, etc.

The invention herein described is particularly suitable for the production of thin-walled, self-sustaining, unsupported continuous film in the form of flattened tubing. If desired, the tubing may be split, whereby continuous sheeting is obtained. Film, either in the form of tubing or sheeting of a thickness of between 0.0005 inch and 0.020 inch or thicker, have been produced.

The principles of this invention can be utilized in conjunction with the specific examples set forth in U. S. Patents Nos. 2,461,975 and 2,461,976.

This invention provides a method and apparatus for producing thermoplastic film which, when reeled, will produce a substantially uniform roll and when unwound therefrom will lie flat.

Since it is obvious that various changes and modifications may be made in the above description without departing from the nature or spirit thereof, this invention is not restricted thereto except as set forth in the appended claims.

I claim:

1. In the inflated tube extrusion method of preparing self-sustaining plastic film, the step which comprises continuously passing the entire exterior peripheral wall surface of successive sections of inflated seamless tubing while in the formative plastic state through the zone of action of a continuously flowing annular converging stream of a gaseous cooling medium blown through an annular outlet completely encircling the tubing and rotating about the center axis of and spaced from the tubing passing therethrough, whereby all points on the entire exterior peripheral wall surface of the tubing in said zone of action are continuously and simultaneously impinged by said cooling medium.

2. In the inflated tube extrusion method of preparing self-sustaining plastic film as set forth in claim 3 wherein said annular outlet is rotated at between about 0.2 and 2.5 R. P. M.

3. An apparatus for preparing self-sustaining plastic film comprising a die having an annular orifice, means to extrude a molten thermoplastic through said orifice to form a seamless tubing, means to continuously withdraw the tubing from the point of extrusion, means to maintain a substantially constant bubble of a gaseous medium in the section of the tubing extending between the point of extrusion and a point spaced therefrom, means to blow a cooling gaseous medium in the form of a continuous annular converging stream completely encircling and simultaneously impinging onto the entire exterior surface of the section of the inflated tubing in the vicinity of the die and means to rotate the last-named means about the longitudinal axis of said tubing.

4. An apparatus for preparing self-sustaining plastic film comprising a die having an annular orifice, means to extrude a molten thermoplastic through said orifice to form a seamless tubing, means to continuously withdraw the tubing from the point of extrusion, means to maintain a substantially constant bubble of a gaseous medium in the section of the tubing extending between the point of extrusion and a point spaced therefrom, a cooling ring rotatably mounted in the vicinity of the die and so positioned that said tubing passes through the passage thereof without contacting said ring, said ring having means to supply a gaseous cooling medium in the form of a continuous annular converging stream completely encircling and impinging on the entire exterior periphery of the successive sections of the inflated tubing passing therethrough and means to rotate said ring about its center axis.

5. An apparatus for preparing self-sustaining plastic film comprising a die having an annular orifice, means to extrude a molten thermoplastic through said orifice to form a seamless tubing, means to continuously withdraw the tubing from the point of extrusion, means to maintain a substantially constant bubble of a gaseous medium in the section of the tubing extending between the point of extrusion and a point spaced therefrom, a plate mounted on said die for rotation about the center axis of said die, a cooling ring secured to said plate, said cooling ring being in the vicinity of the die and so positioned that said tubing passes through the passage thereof without contacting said ring, means to supply a gaseous cooling medium to said ring, said ring having an annular outlet to supply said gaseous cooling medium in the form of a continuous annular converging stream completely encircling and simultaneously impinging on the entire external periphery of the successive sections of the tubing passing therethrough, and means to rotate said cooling ring about the center axis of the tubing passing therethrough.

6. An apparatus for preparing self-sustaining plastic film comprising a die having an annular orifice, means to extrude a molten thermoplastic through said orifice to form a seamless tubing, means to continuously withdraw the tubing from the point of extrusion, means to maintain a substantially constant bubble of a gaseous medium in the section of the tubing extending between the point of extrusion and a point spaced therefrom, a plate mounted on said die for rotation about the center axis of said die, a cooling ring secured to said plate, said cooling ring being in the vicinity of the die and so positioned that said tubing passes through the passage thereof without contacting said ring, a blower secured to said plate to supply a gaseous cooling medium to said ring, an electrical motor carried by said plate to operate said blower, bus rings carried by said plates, means electrically connecting said bus rings to said motor, means to supply electrical energy to said bus rings, said cooling ring having means to supply said gaseous cooling medium onto the entire exterior wall of the successive sections of the inflated tubing passing through said passage and means to rotate said cooling ring together with said plate about the center axis of the tubing passing therethrough.

7. An apparatus as set forth in claim 5 wherein the means to supply electrical energy to the bus rings comprises brushes disposed in sliding contact with said rings and means to supply electrical energy to said brushes.

8. An apparatus as set forth in claim 5 wherein the air ring is provided with a pulley surface and a driven belt cooperating with said pulley surface rotates said ring about its center axis.

9. An apparatus as set forth in claim 5 wherein the cooling ring has an annular outlet in the inner wall thereof through which the gaseous cooling medium is blown onto the entire exterior wall of the section of the inflated tubing passing through said ring.

RUSSELL F. PIERCE.

REFERENCES CITED

The following references are of record in the file of this patent:

UNITED STATES PATENTS

| Number | Name | Date |
| --- | --- | --- |
| 2,150,017 | Barnard | Mar. 7, 1939 |
| 2,275,155 | Monegan | Mar. 3, 1942 |
| 2,447,984 | Lodge | Aug. 24, 1948 |
| 2,461,975 | Fuller | Feb. 15, 1949 |
| 2,461,976 | Schenk | Feb. 15, 1949 |